US012272506B2

(12) United States Patent
Chang

(10) Patent No.: US 12,272,506 B2
(45) Date of Patent: Apr. 8, 2025

(54) ELECTRICAL SWITCH

(71) Applicant: TMY Technology Inc., Taipei (TW)

(72) Inventor: Su-Wei Chang, Taipei (TW)

(73) Assignee: TMY Technology Inc., New Taipei (TW)

( * ) Notice: Subject to any disclaimer, the term of this patent is extended or adjusted under 35 U.S.C. 154(b) by 113 days.

(21) Appl. No.: 18/163,304

(22) Filed: Feb. 2, 2023

(65) Prior Publication Data

US 2023/0268150 A1 Aug. 24, 2023

Related U.S. Application Data

(60) Provisional application No. 63/312,061, filed on Feb. 20, 2022.

(30) Foreign Application Priority Data

Nov. 18, 2022 (TW) .................................. 111144158

(51) Int. Cl.
*H01H 23/16* (2006.01)
*H01H 33/06* (2006.01)
*H01H 37/04* (2006.01)

(52) U.S. Cl.
CPC .......... *H01H 23/164* (2013.01); *H01H 33/06* (2013.01); *H01H 37/04* (2013.01)

(58) Field of Classification Search
CPC ...... H01H 23/164; H01H 33/06; H01H 37/04; H01H 2057/006; H01H 2201/02;
(Continued)

(56) References Cited

U.S. PATENT DOCUMENTS

| | | | |
|---|---|---|---|
| 4,249,056 | A | 2/1981 | MacManus |
| 7,741,571 | B2 | 6/2010 | Hostmann et al. |

(Continued)

FOREIGN PATENT DOCUMENTS

| | | |
|---|---|---|
| CN | 201117523 | 9/2008 |
| TW | I384694 | 2/2013 |
| TW | I573164 | 3/2017 |

OTHER PUBLICATIONS

"Office Action of Taiwan Counterpart Application", issued on Dec. 11, 2023, p. 1-p. 7.

(Continued)

*Primary Examiner* — Ahmed M Saeed
(74) *Attorney, Agent, or Firm* — JCIPRNET

(57) ABSTRACT

An electrical switch, including an insulation base, an insulative-and-movable component, at least two output ports, and at least two transmission ports, is provided. The insulative-and-movable component is disposed on the insulation base and is adapted to operate between at least two switch positions relative to the insulation base. The two output ports are disposed on the insulation base. The two transmission ports are disposed on the insulative-and-movable component. When the insulative-and-movable component is located at one of the two switch positions, one of the two output ports is aligned with one of the two transmission ports and other one of the two output ports is misaligned with other one of the two transmission ports.

25 Claims, 9 Drawing Sheets

(58) Field of Classification Search
CPC ...... H01H 13/64; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/02
See application file for complete search history.

(56) References Cited

U.S. PATENT DOCUMENTS

| | | | | |
|---|---|---|---|---|
| 2004/0012560 | A1* | 1/2004 | Jasso | G06F 1/1662<br>345/156 |
| 2015/0122621 | A1 | 5/2015 | Fukumoto | |
| 2016/0118202 | A1 | 4/2016 | Chen | |
| 2017/0091515 | A1* | 3/2017 | Cao | G06F 1/1647 |

OTHER PUBLICATIONS

"Search Report of Europe Counterpart Application", issued on Jul. 18, 2023, p. 1-p. 7.

* cited by examiner

ELECTRICAL SWITCH

CROSS-REFERENCE TO RELATED APPLICATION

This application claims the priority benefit of U.S. provisional application Ser. No. 63/312,061, filed on Feb. 20, 2022, and Taiwan application serial no. 111144158, filed on Nov. 18, 2022. The entirety of each of the above-mentioned patent applications is hereby incorporated by reference herein and made a part of this specification.

BACKGROUND

Technical Field

The disclosure relates to an electrical switch, and more particularly to a switchable electrical switch.

Description of Related Art

A radio frequency (RF) switch is used in a circuit to selectively establish a conduction path between multiple ports. Current radio frequency switches mostly use mechanical switch structures to switch conduction paths. However, due to the complex composition, the mechanical switch structures have poor performance in terms of operation accuracy, reliability, and response time, and most of the mechanical switch structures are composed of metal components, which are easy to have adverse effects on the impedance and/or other electrical performance of the radio frequency switches.

SUMMARY

The disclosure provides an electrical switch, which has better operation precision, reliability, and response time, and has optimal impedance and/or other electrical properties.

An electrical switch of the disclosure includes an insulation base, an insulative-and-movable component, at least two output ports, and at least two transmission ports. The insulative-and-movable component is movably disposed on the insulation base and is adapted to operate between at least two switch positions relative to the insulation base. The two output ports are disposed on the insulation base. The two transmission ports are disposed on the insulative-and-movable component. When the insulative-and-movable component is located at one of the two switch positions, one of the two output ports is aligned with one of the two transmission ports and other one of the two output ports is misaligned with other one of the two transmission ports. When the insulative-and-movable component is located at other one of the two switch positions, the one of the output ports is misaligned with the one of the two transmission ports and the other one of the output ports is aligned with the other one of the two transmission ports.

In an embodiment of the disclosure, the insulation base has a through hole, and the two output ports are located on an inner wall of the through hole and extend to an outer side of the insulation base.

In an embodiment of the disclosure, the insulative-and-movable component is movably disposed in the through hole, a direction of the insulative-and-movable component operating relative to the insulation base is an axial direction of the through hole, and the two transmission ports are located on a radial outer side of the insulative-and-movable component.

In an embodiment of the disclosure, the electrical switch includes at least one transmission line. The transmission line is disposed on the insulative-and-movable component, and the two transmission ports are formed on the transmission line.

In an embodiment of the disclosure, the electrical switch further includes an input port. The input port is disposed on the insulation base and is connected to the transmission line.

In an embodiment of the disclosure, the transmission line is a spiral line, and the two transmission ports are respectively located at different positions of the spiral line.

In an embodiment of the disclosure, the transmission line includes at least two straight lines separated from each other, and the two transmission ports are respectively located on the two straight lines.

In an embodiment of the disclosure, the electrical switch further includes a master ground portion. The master ground portion is disposed inside the insulative-and-movable component, and the transmission line is located on an outer surface of the insulative-and-movable component and is separated from the master ground portion.

In an embodiment of the disclosure, the electrical switch further includes at least one sub-ground portion. The sub-ground portion is disposed on the outer surface of the insulative-and-movable component and is connected to the master ground portion, there is a gap between at least two sections of the transmission line, and the sub-ground portion is located in the gap and is separated from the two sections.

In an embodiment of the disclosure, the electrical switch further includes at least two conductive blocks. The two conductive blocks are disposed on the transmission line to respectively form the two transmission ports.

In an embodiment of the disclosure, a geometric center of each of the conductive blocks is aligned with the transmission line in an operation direction of the insulative-and-movable component.

In an embodiment of the disclosure, a geometric center of each of the conductive blocks is misaligned with the transmission line in an operation direction of the insulative-and-movable component.

In an embodiment of the disclosure, each of the conductive blocks includes two conductive portions separated from each other.

In an embodiment of the disclosure, materials of the insulation base and the insulative-and-movable component include an insulating material.

In an embodiment of the disclosure, the insulating material includes low-temperature cofired ceramics.

In an embodiment of the disclosure, the electrical switch further includes a drive element. The drive element is adapted to drive the insulative-and-movable component to operate relative to the insulation base.

In an embodiment of the disclosure, the drive element is a piezoelectric actuator or a stepping motor.

Based on the above, in the electrical switch of the disclosure, each transmission port on the insulative-and-movable component is selectively aligned with the output port on the insulation base as the insulative-and-movable component operates relative to the insulation base, so as to switch the conduction path. Compared with the conventional electrical switch that uses the mechanical switch structure to switch the conduction path, the electrical switch of the disclosure has better performance in terms of operation accuracy, reliability, and response time by the operation of the single insulative-and-movable component relative to the insulation base. Moreover, compared with the mechanical switch structure of the conventional electrical switch that is mostly composed of metal components, the insulation base and the insulative-and-movable component in the electrical switch of the disclosure may be made of non-metallic materials, which do not have adverse effects on the impedance and/or other electrical performance of the electrical switch.

DETAILED DESCRIPTION OF DISCLOSED EMBODIMENTS

Figure 1:
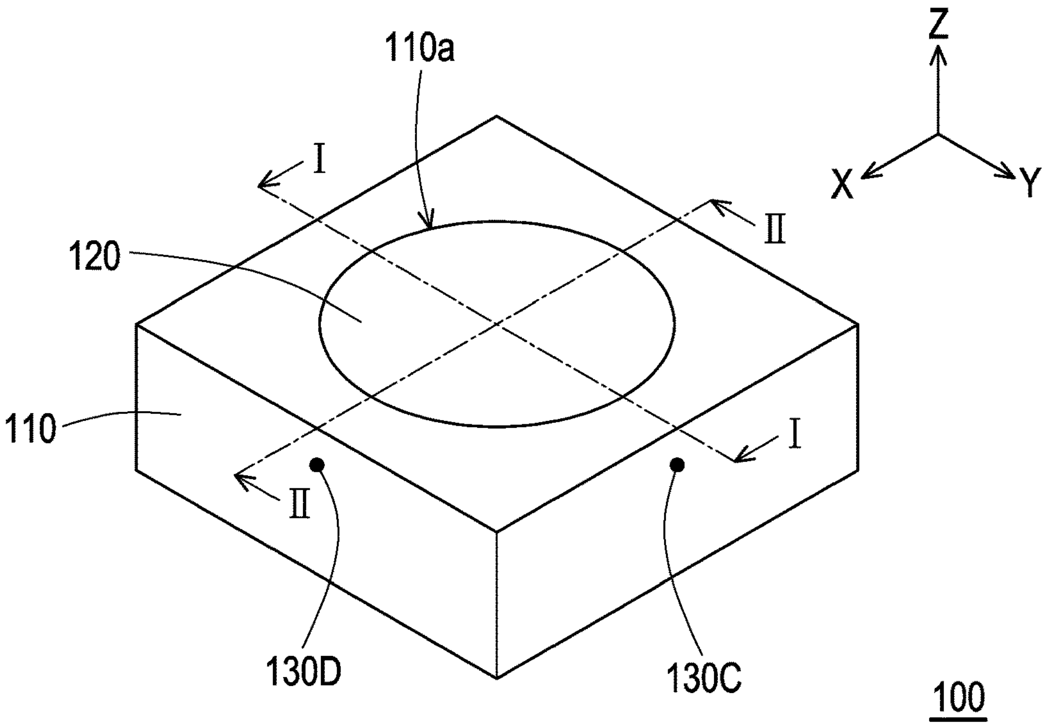
FIG. 1 is a perspective view of an electrical switch according to an embodiment of the disclosure.
Figure 2:
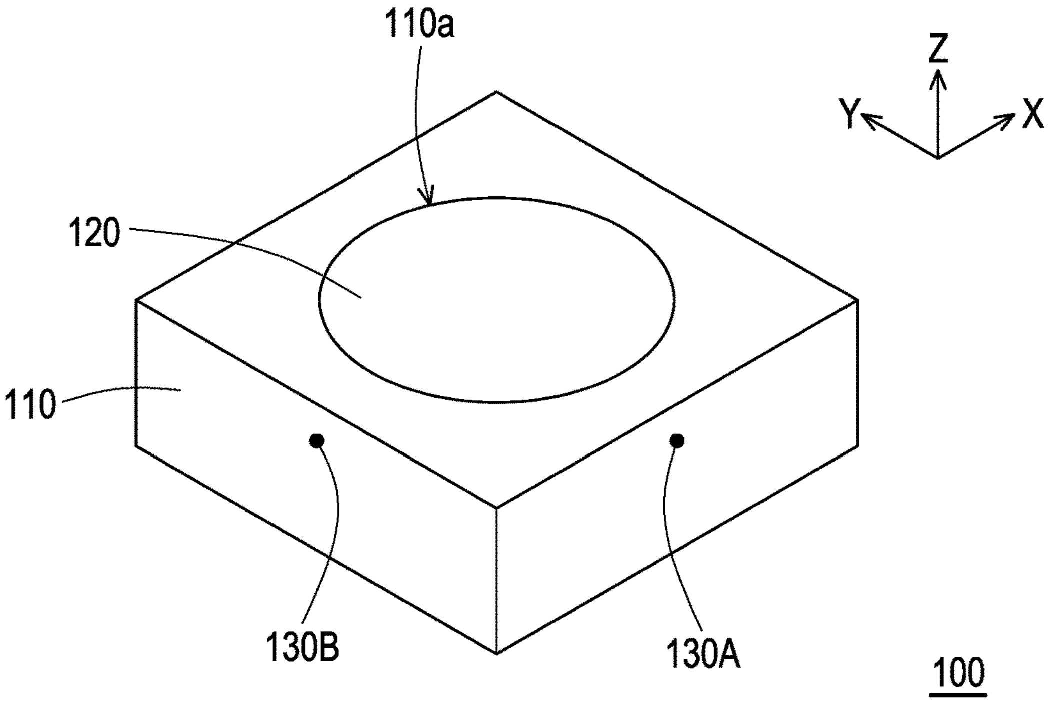
FIG. 2 is a perspective view of the electrical switch of FIG. 1 from another perspective.
Figure 3:
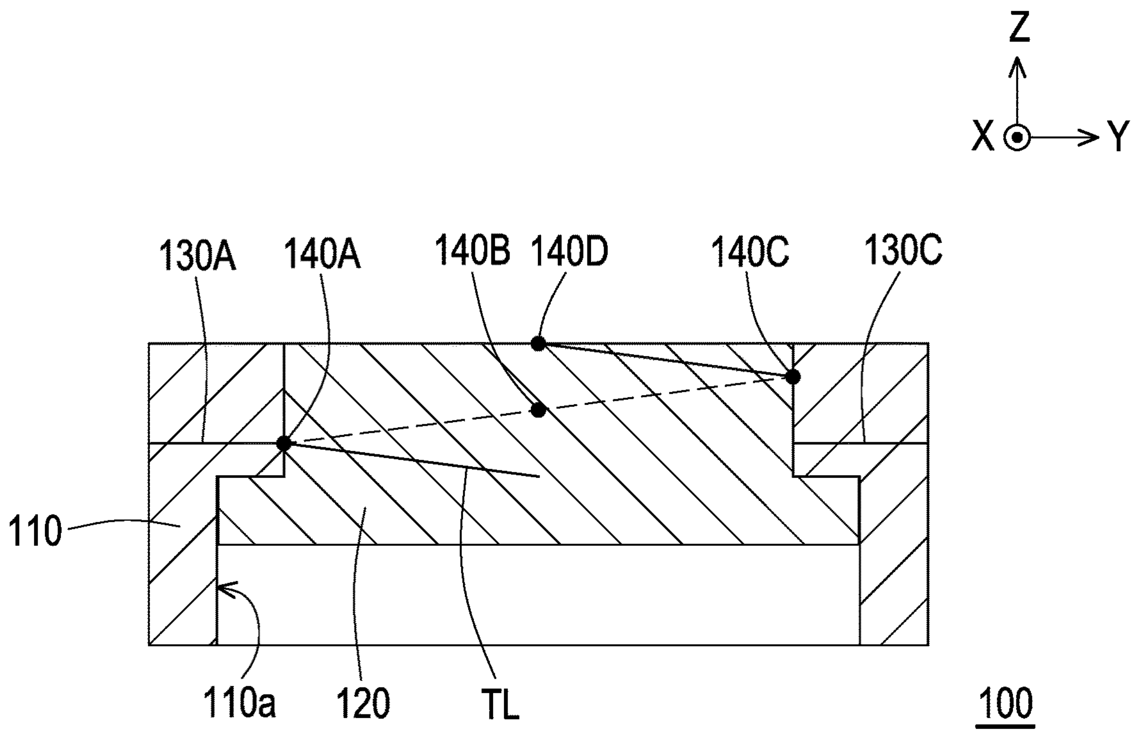
FIG. 3 is a cross-sectional view of the electrical switch of FIG. 1.

FIG. 1 is a perspective view of an electrical switch according to an embodiment of the disclosure, which illustrates axial directions X, Y, and Z. FIG. 2 is a perspective view of the electrical switch of FIG. 1 from another perspective. FIG. 3 is a cross-sectional view of the electrical switch of FIG. 1, and a cross-section thereof corresponds to a line I-I of FIG. 1. Please refer to FIG. 1 to FIG. 3. An electrical switch 100 of the embodiment is, for example, a radio frequency switch or other types of electrical switches and includes an insulation base 110, an insulative-and-movable component 120, and multiple output ports (shown as output ports 130A to 130D) and multiple transmission ports (shown as transmission ports 140A to 140D). The insulative-and-movable component 120 is movably disposed on the insulation base 110 along the axial direction Z. The output ports 130A to 130D are disposed on the insulation base 110, and the transmission ports 140A to 140D are disposed on the insulative-and-movable component 120. The insulative-and-movable component 120 is adapted to move relative to the insulation base 110 along the axial direction Z to operate between multiple switch positions. The disclosure does not limit the number of the transmission ports and the output ports, which may be four as mentioned above or may be two, three, five, or more.

Figure 4:
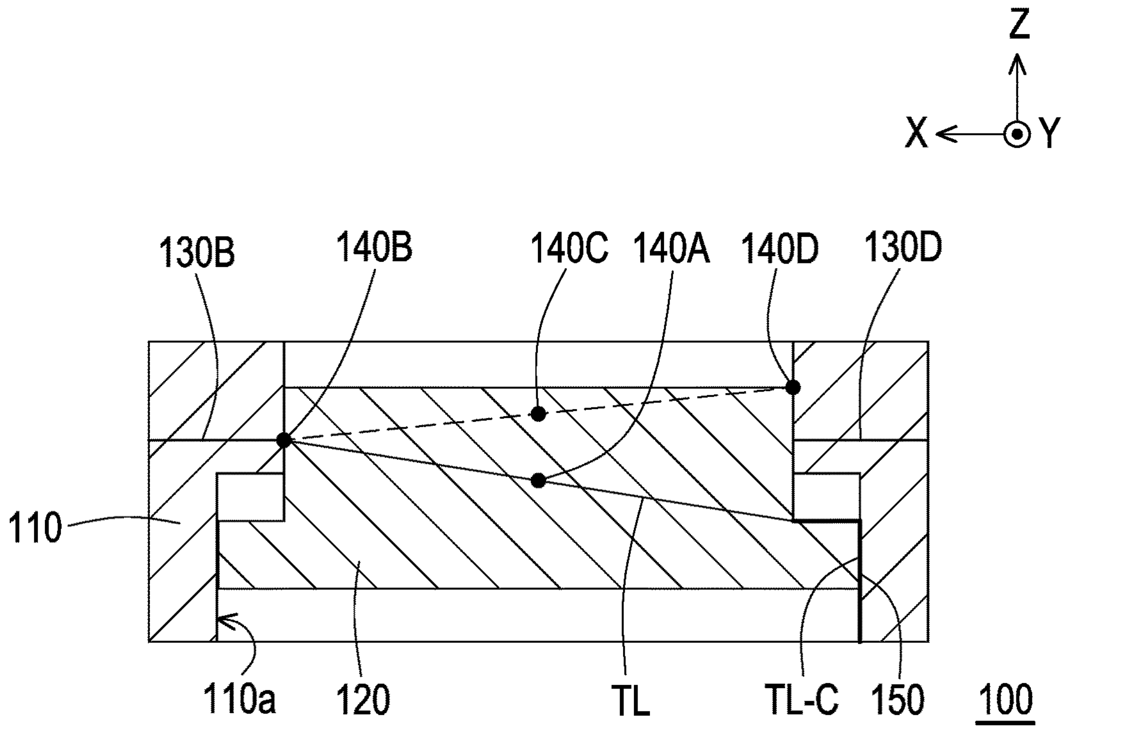
FIG. 4 illustrates an insulative-and-movable component of FIG. 3 moving downward.
Figure 5:
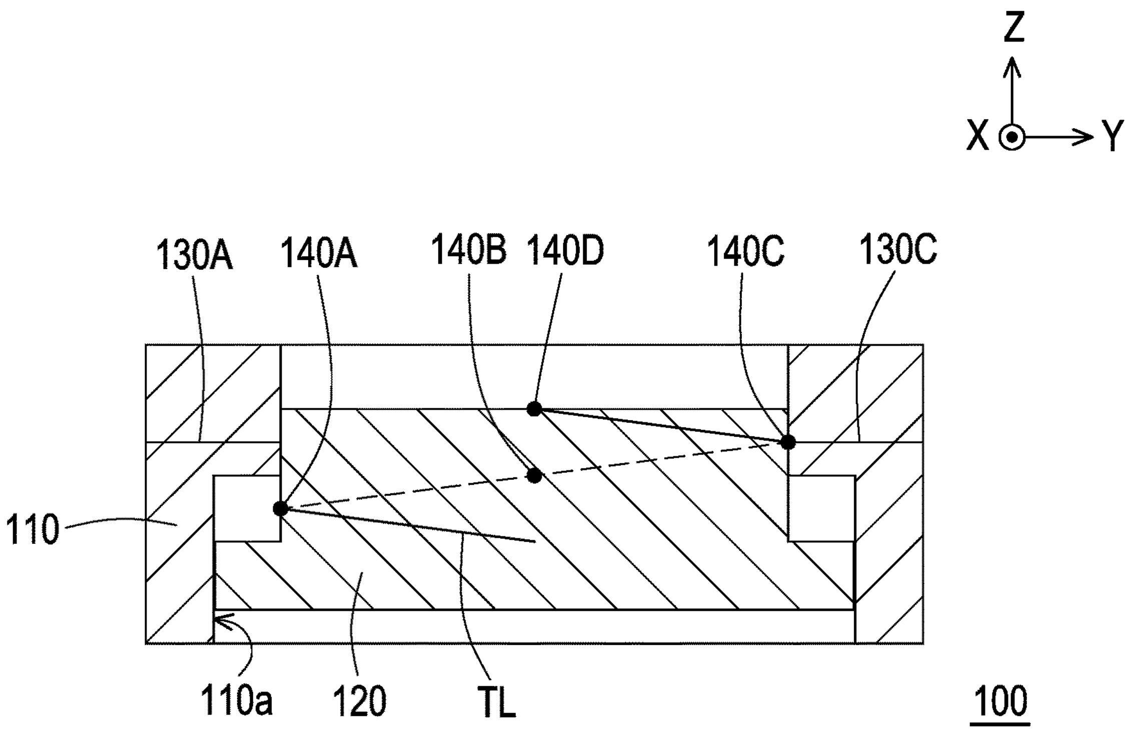
FIG. 5 illustrates the insulative-and-movable component of FIG. 4 moving downward.
Figure 6:
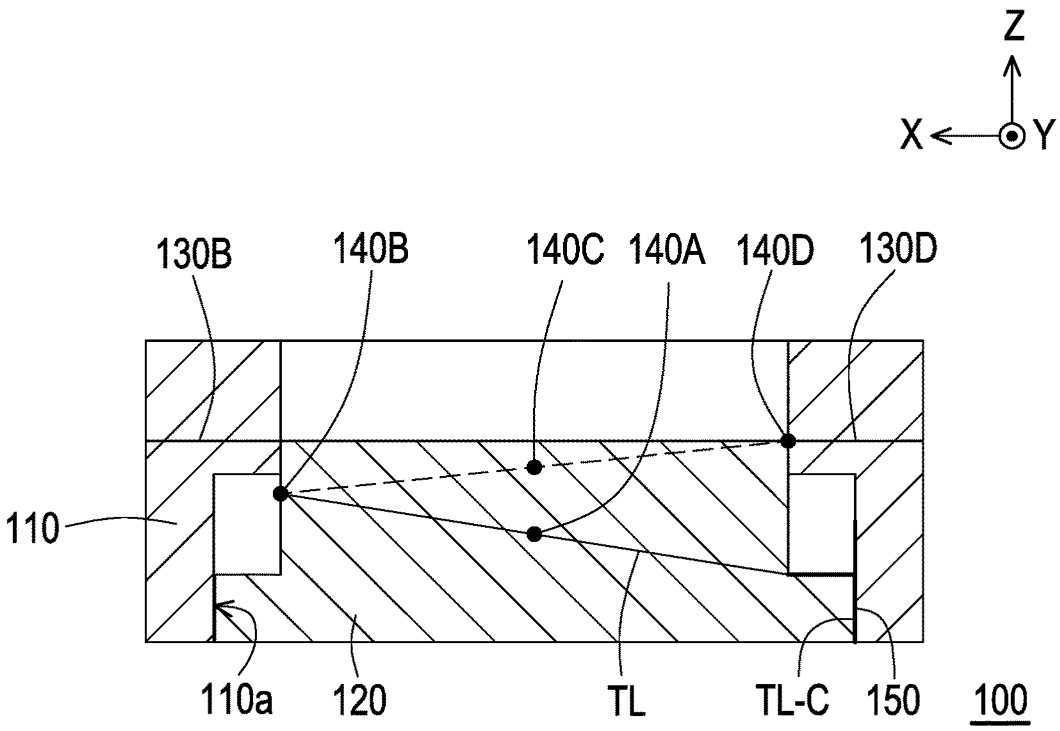
FIG. 6 illustrates the insulative-and-movable component of FIG. 5 moving downward.

FIG. 4 illustrates the insulative-and-movable component of FIG. 3 moving downward, which corresponds to a line II-II of FIG. 1. FIG. 5 illustrates the insulative-and-movable component of FIG. 4 moving downward, which corresponds to the line I-I of FIG. 1. FIG. 6 illustrates the insulative-and-movable component of FIG. 5 moving downward, which corresponds to the line II-II of FIG. 1. Specifically, when the insulative-and-movable component 120 is located at the switch position shown in FIG. 3, the output port 130A is aligned with the transmission port 140A, and the output ports 130B to 130D are respectively misaligned with the transmission ports 140B to 140D. When the insulative-and-movable component 120 moves downward from the switch position shown in FIG. 3 to the switch position shown in FIG. 4, the output ports 130A, 130C, and 130D are respectively misaligned with the transmission ports 140A, 140C, and 140D, and the output port 130B is aligned with the transmission port 140B. When the insulative-and-movable component 120 continues to move downward from the switch position shown in FIG. 4 to the switch position shown in FIG. 5, the output ports 130A, 130B, and 130D are respectively misaligned with the transmission ports 140A, 140B, and 140D, and the output port 130C is aligned with the transmission port 140C. When the insulative-and-movable component 120 continues to move downward from the switch position shown in FIG. 5 to the switch position shown in FIG. 6, the output ports 130A, 130B, and 130C are respectively misaligned with the transmission ports 140A, 140B, and 140C, and the output port 130D is aligned with the transmission port 140D. In FIG. 3 to FIG. 5, a part of a transmission line TL shown as a solid line only means that the part of the transmission line TL should be located on a proximal side relative to the insulative-and-movable component 120 in the cross-sectioned I-I or II-II in the line of sight, and does not mean that the part of the transmission line TL can be directly observed in the cross-section.

In the embodiment, the output ports 130A to 130D are, for example, located at the same position in the axial direction Z, and the transmission ports 140A to 140D are, for example, respectively located at different positions in the axial direction Z. Therefore, as mentioned above, when the insulative-and-movable component 120 is located at any switch position, only one of the output ports 130A to 130D is aligned with the corresponding one of the transmission ports 140A to 140D to achieve the switch effect of the conduction path. In other embodiments, the output ports 130A to 130D may also be respectively located at different positions in the axial direction Z, and the transmission ports 140A to 140D may be located at the same position in the axial direction Z, or the output ports 130A to 130D may be respectively located at different positions in the axial direction Z, and the transmission ports 140A to 140D are respectively located at different positions in the axial direction Z, so as to achieve the same switch effect of the conduction path, which is not limited in the disclosure. In addition, the insulative-and-movable component 120 of the embodiment may be disposed on the insulation base 110 in a sliding manner along the axial direction Z as mentioned above, may also be changed to being rotatably disposed on the insulation base 110 to switch the conduction path, or may also operate relative to the insulation base 110 in other appropriate manners to switch the conduction path, which is not limited in the disclosure.

As mentioned above, in the electrical switch 100 of the embodiment, the transmission ports 140A to 140D on the insulative-and-movable component 120 are selectively aligned with the output ports 130A to 130D on the insulation base 110 as the position of the insulative-and-movable component 120 changes relative to the insulation base 110, so as to switch the conduction path. In the embodiment, the materials of the insulation base 110 and the insulative-and-movable component 120 are, for example, low-temperature cofired ceramics (LTCC) or other types of insulating materials, which are not limited in the disclosure.

Figure 7:
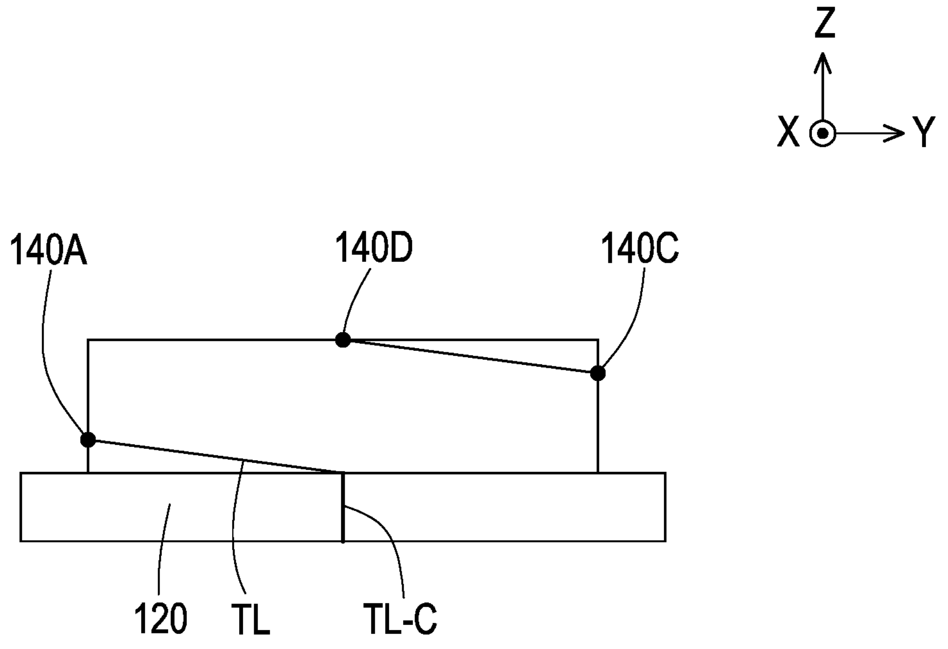
FIG. 7 is a side view of the insulative-and-movable component of FIG. 1.

In detail, in the embodiment, the insulation base 110 has a through hole 110*a*, and the output ports 130A to 130D are located on an inner wall of the through hole 110*a* and extend to an outer side of the insulation base 110. The insulative-and-movable component 120 is movably disposed in the through hole 110*a*, a direction of the insulative-and-movable component 120 operating relative to the insulation base 110 is an axial direction of the through hole 110*a*, and the transmission ports 140A to 140D are located on a radial outer side of the insulative-and-movable component 120. Moreover, the electrical switch 100 further includes a transmission line TL, the transmission line TL is disposed on the insulative-and-movable component 120, and the transmission ports 140A to 140D are formed on the transmission line TL. In addition, FIG. 7 is a side view of the insulative-and-movable component of FIG. 1. An extension section TL-C of the transmission line TL extends to an outer edge of the insulative-and-movable component 120 as shown in FIG. 4, FIG. 6, and FIG. 7. The electrical switch 100 further includes an input port 150 (shown in FIG. 4 and FIG. 6), and the input port 150 is disposed on the insulation base 110 and is connected to the extension section TL-C of the transmission line TL. Thus, regardless of which position shown in FIG. 3 to FIG. 6 that the insulative-and-movable component 120 moves to, the transmission line TL always contacts the input port 150 through the extension section TL-C. As shown in FIG. 3 to FIG. 6, the transmission line TL of the embodiment is, for example, a spiral line, and the transmission ports 140A to 140D are respectively located at different positions of the spiral line.

Figure 8:
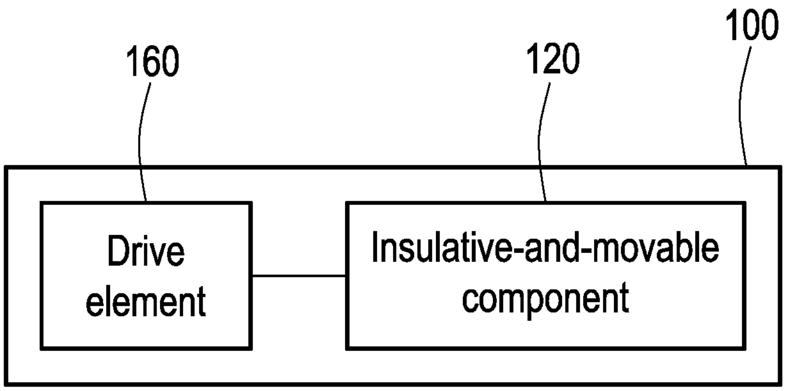
FIG. 8 is a block schematic view of some components of the electrical switch of FIG. 1.

The disclosure does not limit the manner of driving the insulative-and-movable component 120 to operate, which will be illustrated below with an example. FIG. 8 is a block schematic view of some components of the electrical switch of FIG. 1. Please refer to FIG. 8. The electrical switch 100 of the embodiment further includes a drive element 160, and the drive element 160 is connected to the insulative-and-movable component 120 and is adapted to drive the insulative-and-movable component 120 to operate (for example, to move along a Z axis or to rotate around the Z axis) relative to the insulation base 110 (shown in FIG. 1 to FIG. 6). The drive element 160 is, for example, a piezoelectric actuator, a stepping motor, or other types of actuators, and the disclosure is not limited thereto.

Figure 9:
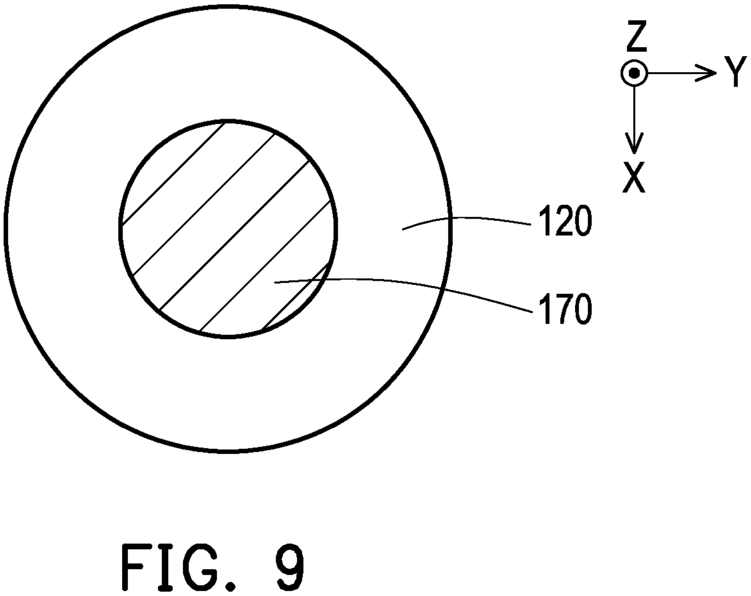
FIG. 9 is a top view of the insulative-and-movable component of FIG. 1.

FIG. 9 is a top view of the insulative-and-movable component of FIG. 1. Please refer to FIG. 9. In the embodiment, the electrical switch 100 (shown in FIG. 1 to FIG. 8) further includes a master ground portion 170, and the master ground portion 170 is disposed inside the insulative-and-movable component 120. The transmission line TL is located on an outer surface of the insulative-and-movable component 120 and is separated from the master ground portion 170 as shown in FIG. 3 to FIG. 6.

Figure 10:
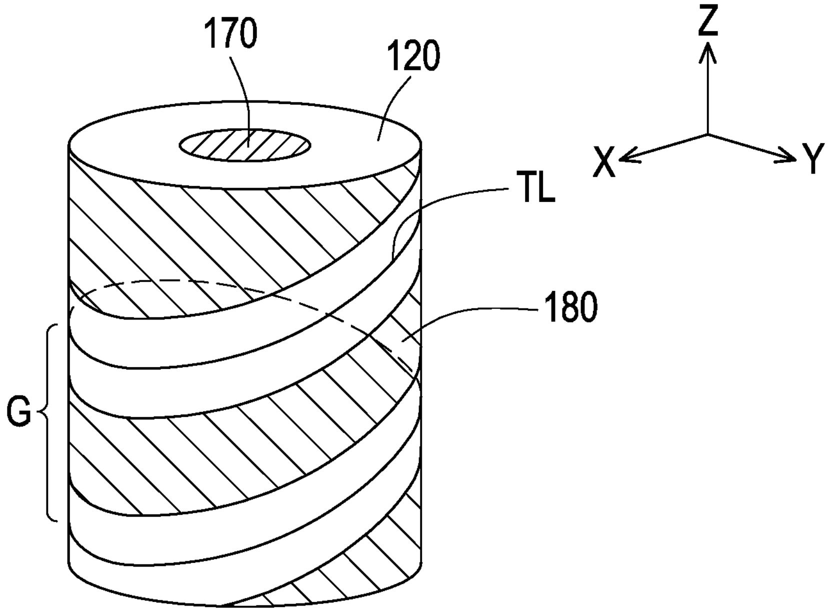
FIG. 10 is a perspective view of an insulative-and-movable component according to another embodiment of the disclosure.

FIG. 10 is a perspective view of an insulative-and-movable component according to another embodiment of the disclosure. The main difference between the embodiment shown in FIG. 10 and the foregoing embodiment is that the electrical switch of FIG. 10 further includes a sub-ground portion 180, the sub-ground portion 180 is disposed on the outer surface of the insulative-and-movable component 120 and is inwardly connected to the master ground portion 170, there is a gap G between two adjacent sections of the transmission line TL, and the sub-ground portion 180 is located in the gap G and is separated from the two adjacent sections of the transmission line TL. In addition to providing a grounding function together with the master ground portion 170, the sub-ground portion 180 may also provide shielding between the two adjacent sections of the transmission line TL to prevent the two adjacent sections of the transmission line TL from interfering with each other.

Figure 11:
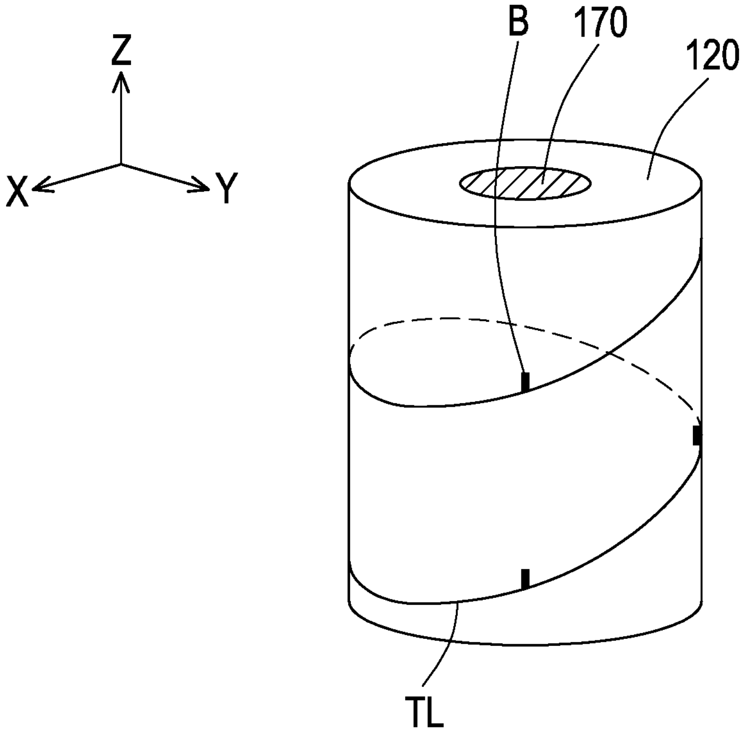
FIG. 11 is a perspective view of an insulative-and-movable component according to another embodiment of the disclosure.
Figure 12:
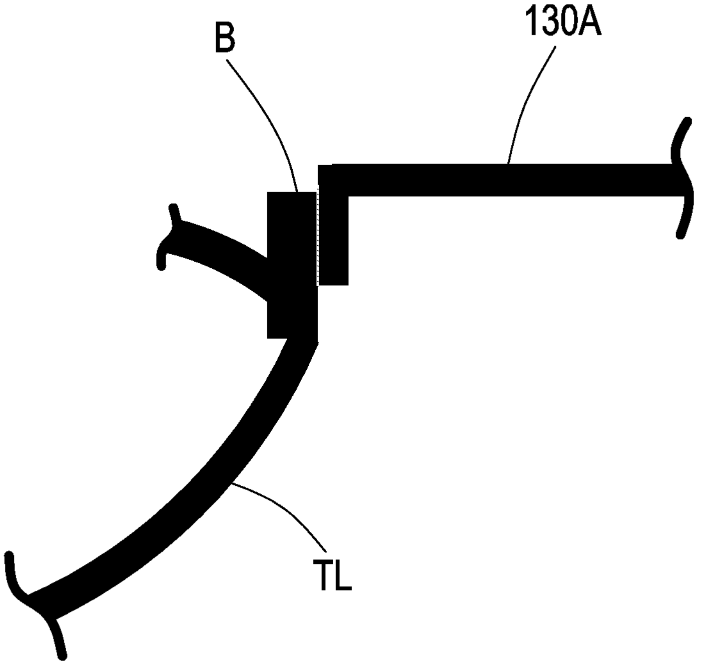
FIG. 12 illustrates a transmission line of FIG. 11 connected to an output port.

FIG. 11 is a perspective view of an insulative-and-movable component according to another embodiment of the disclosure. FIG. 12 illustrates a transmission line of FIG. 11 connected to an output port. The main difference between the embodiment shown in FIG. 11 and FIG. 12 and the foregoing embodiment is that the electrical switch of FIG. 11 and FIG. 12 further includes multiple conductive blocks B, and the conductive blocks B are disposed on the transmission line TL to respectively form multiple transmission ports (for example, the transmission ports 140A to 140D in the foregoing embodiment). The conductive block B is, for example, a rectangular body and is used to provide a larger contact area to contact the output port (the output port 130A is taken as an example in FIG. 12).

Figure 13:
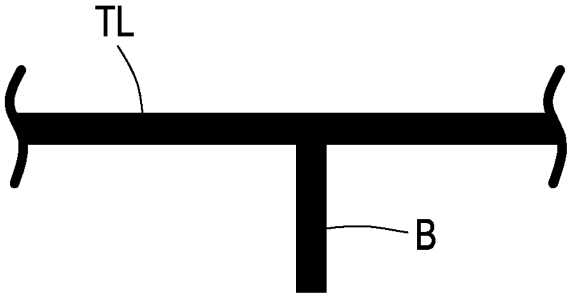
FIG. 13 is a schematic view of a transmission line and a conductive block according to another embodiment of the disclosure.
Figure 14:
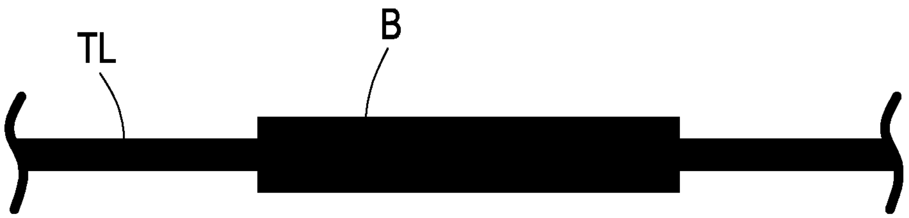
FIG. 14 is a schematic view of a transmission line and a conductive block according to another embodiment of the disclosure.
Figure 15:
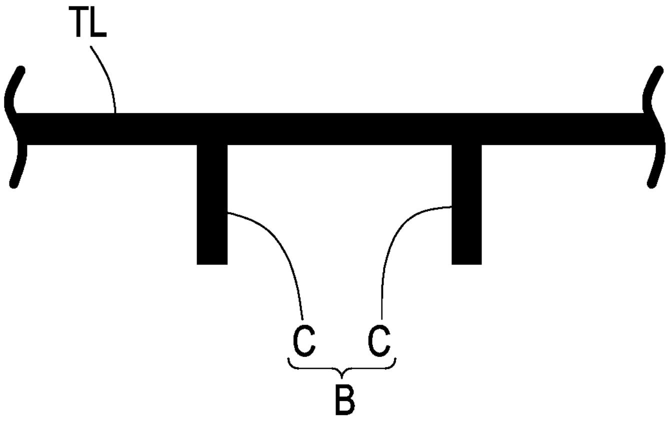
FIG. 15 is a schematic view of a transmission line and a conductive block according to another embodiment of the disclosure.

In the embodiment shown in FIG. 11 and FIG. 12, each conductive block B is located above the transmission line TL, so that a geometric center of each conductive block B is misaligned with the transmission line TL in an operation direction (that is, the axial direction Z) of the insulative-and-movable component 120. The disclosure does not limit the configuration manner of the conductive block B, which is illustrated below with an example. FIG. 13 is a schematic view of a transmission line and a conductive block according to another embodiment of the disclosure. The main difference between the embodiment shown in FIG. 13 and the foregoing embodiment is that the conductive block B of FIG. 13 is located below the transmission line TL instead of above the transmission line TL. FIG. 14 is a schematic view of a transmission line and a conductive block according to another embodiment of the disclosure. The main difference between the embodiment shown in FIG. 14 and the foregoing embodiment is that the conductive block B of FIG. 14 has a larger width in an extension direction of the transmission line TL, and the geometric center of the conductive block B is aligned with the transmission line TL in the operation direction of the insulative-and-movable component. FIG. 15 is a schematic view of a transmission line and a conductive block according to another embodiment of the disclosure. The main difference between the embodiment shown in FIG. 15 and the foregoing embodiment is that the conductive block B of FIG. 15 includes two conductive portions C separated from each other.

Figure 16:
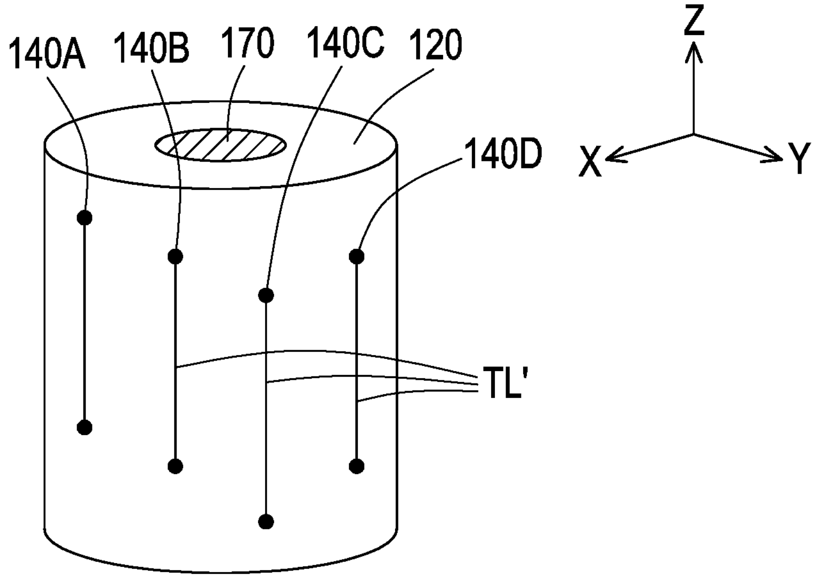
FIG. 16 is a perspective view of an insulative-and-movable component according to another embodiment of the disclosure.

In addition, the disclosure does not limit the form of the transmission line, which is illustrated below with an example. FIG. 16 is a perspective view of an insulative-and-movable component according to another embodiment of the disclosure. The main difference between the embodiment shown in FIG. 16 and the foregoing embodiment is that a transmission line TL' of FIG. 16 includes multiple straight lines separated from each other, the transmission ports 140A to 140D are respectively located on the straight lines, and a lower end of each straight line is used to connect to the input port (the input port 150 shown in FIG. 4 and FIG. 6) of the electrical switch. In other embodiments, the transmission line may be in other forms and numbers, as long as each of the transmission ports 140A to 140D can be selectively aligned with the output ports 130A to 130D on the insulation base 110 as the insulative-and-movable component 120 operates relative to the insulation base 110.

In summary, in the electrical switch of the disclosure, each transmission port on the insulative-and-movable component is selectively aligned with the output port on the insulation base as the insulative-and-movable component operates relative to the insulation base, so as to switch the conduction path. Compared with the conventional electrical switch that uses the mechanical switch structure to switch the conduction path, the electrical switch of the disclosure has better performance in terms of operation accuracy, reliability, and response time by the operation of the single insulative-and-movable component relative to the insulation base. Moreover, compared with the mechanical switch structure of the conventional electrical switch that is mostly composed of metal components, the insulation base and the insulative-and-movable component in the electrical switch of the disclosure may be made of non-metallic materials, which do not have adverse effects on the impedance and/or other electrical performance of the electrical switch.

What is claimed is:

1. An electrical switch, comprising:

an insulation base;

an insulative-and-movable component, movably disposed on the insulation base and adapted to operate between at least two switch positions relative to the insulation base;

at least two output ports, disposed on the insulation base; and at least two transmission ports, disposed on the insulative-and-movable component, wherein when the insulative-and-movable component is located at one of the at least two switch positions, one of the at least two output ports is aligned with one of the at least two transmission ports and other one of the at least two output ports is misaligned with other one of the at least two transmission ports, when the insulative-and-movable component is located at other one of the at least two switch positions, the one of the at least two output ports is misaligned with the one of the at least two transmission ports and the other one of the at least two output ports is aligned with the other one of the at least two transmission ports, wherein the insulation base has a through hole, and the at least two output ports are located on an inner wall of the through hole and extend to an outer side of the insulation base, wherein the insulative-and-movable component is movably disposed in the through hole, a direction of the insulative-and-movable component operating relative to the insulation base is an axial direction of the through hole, and the at least two transmission ports are located on a radial outer side of the insulative-and-movable component.

2. The electrical switch according to claim 1, comprising at least one transmission line, wherein the at least one transmission line is disposed on the insulative-and-movable component, and the at least two transmission ports are formed on the at least one transmission line.

3. The electrical switch according to claim 2, further comprising an input port, wherein the input port is disposed on the insulation base and is connected to the at least one transmission line.

4. The electrical switch according to claim 2, wherein the at least one transmission line is a spiral line, and the at least two transmission ports are respectively located at different positions of the spiral line.

5. The electrical switch according to claim 2, further comprising a master ground portion, wherein the master ground portion is disposed inside the insulative-and-movable component, and the at least one transmission line is located on an outer surface of the insulative-and-movable component and is separated from the master ground portion.

6. The electrical switch according to claim 2, further comprising at least two conductive blocks, wherein the at least two conductive blocks are disposed on the at least one transmission line to respectively form the at least two transmission ports.

7. The electrical switch according to claim 6, wherein a geometric center of each of the at least two conductive blocks is misaligned with the at least one transmission line in an operation direction of the insulative-and-movable component.

8. The electrical switch according to claim 1, wherein materials of the insulation base and the insulative-and-movable component comprise an insulating material.

9. The electrical switch according to claim 8, wherein the insulating material comprises low-temperature cofired ceramics.

10. The electrical switch according to claim 1, further comprising a drive element, wherein the drive element is adapted to drive the insulative-and-movable component to operate relative to the insulation base.

11. The electrical switch according to claim 10, wherein the drive element is a piezoelectric actuator or a stepping motor.

12. An electrical switch, comprising:

an insulation base;

an insulative-and-movable component, movably disposed on the insulation base and adapted to operate between at least two switch positions relative to the insulation base;

at least two output ports, disposed on the insulation base;

at least two transmission ports, disposed on the insulative-and-movable component;

at least one transmission line, wherein the at least one transmission line is disposed on the insulative-and-movable component, and the at least two transmission ports are formed on the at least one transmission line; and a master ground portion, wherein the master ground portion is disposed inside the insulative-and-movable component, and the at least one transmission line is located on an outer surface of the insulative-and-movable component and is separated from the master ground portion, wherein when the insulative-and-movable component is located at one of the at least two switch positions, one of the at least two output ports is aligned with one of the at least two transmission ports and other one of the at least two output ports is misaligned with other one of the at least two transmission ports, when the insulative-and-movable component is located at other one of the at least two switch positions, the one of the at least two output ports is misaligned with the one of the at least two transmission ports and the other one of the at least two output ports is aligned with the other one of the at least two transmission ports.

13. The electrical switch according to claim 12, wherein the insulation base has a through hole, and the at least two output ports are located on an inner wall of the through hole and extend to an outer side of the insulation base.

14. The electrical switch according to claim 12, further comprising an input port, wherein the input port is disposed on the insulation base and is connected to the at least one transmission line.

15. The electrical switch according to claim 12, wherein the at least one transmission line is a spiral line, and the at least two transmission ports are respectively located at different positions of the spiral line.

16. The electrical switch according to claim 12, wherein the at least one transmission line comprises at least two straight lines separated from each other, and the at least two transmission ports are respectively located on the at least two straight lines.

17. The electrical switch according to claim 12, further comprising at least one sub-ground portion, wherein the at least one sub-ground portion is disposed on the outer surface of the insulative-and-movable component and is connected to the master ground portion, there is a gap between at least two sections of the at least one transmission line, and the at least one sub-ground portion is located in the gap and is separated from the at least two sections.

18. The electrical switch according to claim 12, further comprising at least two conductive blocks, wherein the at least two conductive blocks are disposed on the at least one transmission line to respectively form the at least two transmission ports.

19. The electrical switch according to claim 18, wherein a geometric center of each of the at least two conductive blocks is aligned with the at least one transmission line in an operation direction of the insulative-and-movable component.

20. The electrical switch according to claim 18, wherein a geometric center of each of the at least two conductive blocks is misaligned with the at least one transmission line in an operation direction of the insulative-and-movable component.

21. The electrical switch according to claim 18, wherein each of the at least two conductive blocks comprises two conductive portions separated from each other.

22. The electrical switch according to claim 12, wherein materials of the insulation base and the insulative-and-movable component comprise an insulating material.

23. The electrical switch according to claim 22, wherein the insulating material comprises low-temperature cofired ceramics.

24. The electrical switch according to claim 12, further comprising a drive element, wherein the drive element is adapted to drive the insulative-and-movable component to operate relative to the insulation base.

25. The electrical switch according to claim 24, wherein the drive element is a piezoelectric actuator or a stepping motor.

* * * * *